United States Patent [19]

Singer et al.

[11] Patent Number: 5,096,731

[45] Date of Patent: * Mar. 17, 1992

[54] REDUCED FAT YOGURT

[75] Inventors: Norman S. Singer, Highland Park, Ill.; Joseph Latella, London; Shoji Yamamoto, Prince Edward Island, both of Canada

[73] Assignee: John Labatt Limited/John Labatt Limitee, London, Canada

[*] Notice: The portion of the term of this patent subsequent to Mar. 29, 2005 has been disclaimed.

[21] Appl. No.: 568,854

[22] Filed: Aug. 17, 1990

Related U.S. Application Data

[63] Continuation-in-part of Ser. No. 367,261, Jun. 16, 1989, Pat. No. 4,961,953, which is a continuation of Ser. No. 127,955, Dec. 2, 1987, abandoned, which is a continuation-in-part of Ser. No. 606,959, May 4, 1984, Pat. No. 4,734,287.

[51] Int. Cl.$^5$ ............................................. A23C 9/123
[52] U.S. Cl. .................................... 426/583; 426/656; 426/804
[58] Field of Search ................... 426/583, 656, 804

[56] References Cited

U.S. PATENT DOCUMENTS

| | | |
|---|---|---|
| 2,377,624 | 6/1945 | Gordon . |
| 2,566,477 | 9/1951 | Abrahamczik et al. . |
| 2,602,746 | 7/1952 | Meade . |
| 2,710,808 | 6/1955 | Peebles et al. . |
| 3,066,133 | 11/1962 | Pinckney . |
| 3,300,318 | 1/1967 | Szczesniak et al. . |
| 3,397,997 | 8/1968 | Japikse . |
| 3,507,663 | 4/1970 | Starook et al. . |
| 3,552,981 | 1/1971 | Luksas . |
| 3,594,192 | 7/1971 | Mullen et al. . |
| 3,615,661 | 10/1971 | Ellinger et al. . |
| 3,620,757 | 11/1971 | Ellinger et al. . |
| 3,632,350 | 1/1972 | Battista . |
| 3,642,490 | 2/1972 | Hawley et al. . |
| 3,642,492 | 2/1972 | Arndt . |
| 3,642,493 | 2/1972 | Arndt . |
| 3,644,326 | 2/1972 | Pien . |
| 3,689,288 | 3/1972 | Duren . |
| 3,708,307 | 1/1973 | Lundstadt . |
| 3,723,407 | 3/1973 | Miller et al. . |
| 3,726,690 | 4/1973 | Schuppner . |
| 3,737,326 | 6/1973 | Basso et al. . |
| 3,757,005 | 9/1973 | Kautz et al. . |
| 3,793,464 | 2/1974 | Rusch . |
| 3,798,339 | 3/1974 | Peng . |
| 3,800,052 | 3/1974 | Inagami et al. . |
| 3,829,592 | 8/1974 | Bratland . |
| 3,842,062 | 10/1974 | Eastman . |
| 3,843,828 | 10/1974 | Arndt . |
| 3,852,503 | 12/1974 | Magnino et al. . |
| 3,853,839 | 12/1974 | Magnino et al. . |
| 3,865,956 | 2/1975 | Fukushima et al. . |
| 3,873,751 | 3/1975 | Arndt . |
| 3,891,777 | 6/1975 | Boyer . |
| 3,891,778 | 6/1975 | Boyer . |
| 3,892,873 | 7/1975 | Kolen et al. . |
| 3,899,605 | 8/1975 | Schaap . |
| 3,914,435 | 10/1975 | Maubois et al. . |
| 3,922,375 | 11/1975 | Dalan et al. . |
| 3,929,892 | 12/1975 | Hynes et al. . |
| 3,930,039 | 12/1975 | Kuipers . |
| 3,930,056 | 12/1975 | Feminella et al. . |

(List continued on next page.)

FOREIGN PATENT DOCUMENTS

| | | |
|---|---|---|
| 0008242 | 2/1980 | European Pat. Off. . |
| 0076549 | 4/1983 | European Pat. Off. . |
| 7505092 | 9/1976 | France . |
| 8022390 | 7/1982 | France . |
| 236449A1 | 6/1986 | German Democratic Rep. . |
| 1363783 | 8/1974 | United Kingdom . |
| 2063273 | 6/1981 | United Kingdom . |

OTHER PUBLICATIONS

Holsinger et al., *Food Technoloty*, pp. 59, 60, 64 and 65 (Feb. 1973).
Whitaker et al., *Food Proteins*, pp. 173-189 (1977).

*Primary Examiner*—Donald E. Czaja
*Assistant Examiner*—Evan Federman
*Attorney, Agent, or Firm*—Marshall, O'Toole, Gerstein, Murray & Bicknell

[57] ABSTRACT

The present invention provides yogurt formulated with microparticulated protein which serves as a replacement for all or part of the fat and/or oil normally found in yogurt.

1 Claim, 1 Drawing Sheet

U.S. PATENT DOCUMENTS

| | | |
|---|---|---|
| 3,935,323 | 1/1976 | Feminella et al. . |
| 3,969,534 | 7/1976 | Pavey et al. . |
| 3,978,243 | 8/1976 | Pedersen . |
| 3,982,039 | 9/1976 | Scibelli et al. . |
| 4,018,752 | 4/1977 | Buhler et al. . |
| 4,029,825 | 6/1977 | Chang . |
| 4,031,261 | 6/1977 | Durst . |
| 4,031,267 | 6/1977 | Berry et al. . |
| 4,057,655 | 11/1977 | Okada et al. . |
| 4,058,510 | 11/1977 | Concilio-Nolan et al. . |
| 4,072,670 | 2/1978 | Goodnight, Jr. et al. . |
| 4,079,154 | 3/1978 | Yasumatsu . |
| 4,089,987 | 5/1978 | Chang et al. . |
| 4,091,116 | 5/1978 | Edwards et al. . |
| 4,103,037 | 7/1978 | Bodor et al. . |
| 4,103,038 | 7/1978 | Roberts . |
| 4,104,413 | 8/1978 | Wynn et al. . |
| 4,107,334 | 8/1978 | Jolly . |
| 4,113,716 | 9/1978 | Gomi et al. . |
| 4,125,630 | 11/1978 | Orthoefer . |
| 4,137,339 | 1/1979 | Kudo et al. . |
| 4,140,808 | 2/1979 | Jonson . |
| 4,143,174 | 3/1979 | Shah et al. . |
| 4,147,810 | 4/1979 | Kellor . |
| 4,169,160 | 9/1979 | Wingerd et al. . |
| 4,183,970 | 1/1980 | May et al. . |
| 4,186,218 | 1/1980 | Gomi et al. . |
| 4,188,411 | 2/1980 | Kuipers et al. . |
| 4,192,901 | 3/1980 | Yasumatsu et al. . |
| 4,194,018 | 3/1980 | Hodel et al. . |
| 4,194,019 | 3/1980 | Yasumatsu et al. . |
| 4,205,094 | 5/1980 | Baird et al. . |
| 4,209,503 | 5/1980 | Shah et al. . |
| 4,212,893 | 7/1980 | Takahata . |
| 4,217,370 | 9/1980 | Rawlings et al. . |
| 4,218,490 | 9/1980 | Phillips et al. . |
| 4,230,738 | 10/1980 | Shemer et al. . |
| 4,234,620 | 11/1980 | Howard et al. . |
| 4,244,983 | 1/1981 | Baker . |
| 4,247,566 | 1/1981 | Inagami et al. . |
| 4,248,895 | 2/1981 | Stroz et al. . |
| 4,251,562 | 2/1981 | LeGrand et al. . |
| 4,252,835 | 2/1981 | Maerker et al. . |
| 4,259,361 | 3/1981 | Procter . |
| 4,260,636 | 4/1981 | Yasumatsu et al. . |
| 4,265,924 | 5/1981 | Buhler et al. . |
| 4,267,100 | 5/1981 | Chang et al. . |
| 4,271,201 | 6/1981 | Stenne . |
| 4,275,084 | 6/1981 | Ohyabu et al. . |
| 4,278,597 | 7/1981 | Cho et al. . |
| 4,279,939 | 7/1981 | Cho . |
| 4,291,067 | 9/1981 | Buhler et al. . |
| 4,293,571 | 10/1981 | Olofsson et al. . |
| 4,305,964 | 12/1981 | Moran et al. . |
| 4,305,970 | 12/1981 | Moran et al. . |
| 4,307,118 | 12/1981 | Kajs . |
| 4,308,294 | 12/1981 | Rispoli et al. . |
| 4,325,937 | 4/1982 | Spence et al. . |
| 4,325,977 | 4/1982 | Remer . |
| 4,333,958 | 6/1982 | Egnell . |
| 4,340,612 | 7/1982 | Askman et al. . |
| 4,352,832 | 10/1982 | Wood et al. . |
| 4,360,537 | 11/1982 | Tan et al. . |
| 4,362,761 | 12/1982 | Chang et al. . |
| 4,379,175 | 4/1983 | Baker . |
| 4,438,148 | 3/1984 | O'Rourke et al. . |
| 4,486,345 | 12/1984 | Callewaert . |
| 4,497,834 | 2/1985 | Barta . |
| 4,497,836 | 2/1985 | Marquardt et al. . |
| 4,500,454 | 2/1985 | Chang . |
| 4,515,825 | 5/1985 | Moran et al. . |
| 4,572,837 | 2/1986 | Poole et al. . |
| 4,675,194 | 6/1987 | Gaffney . |
| 4,734,287 | 3/1988 | Singer et al. ............ 426/41 |
| 4,762,726 | 8/1988 | Soucie et al. . |
| 4,885,179 | 12/1989 | Soucie et al. . |
| 4,975,287 | 12/1990 | Zibell et al. . |

REDUCED FAT YOGURT

CROSS REFERENCE TO RELATED APPLICATIONS

This application is a continuation-in-part of our co-pending U.S. patent application Ser. No. 07/367,261 filed June 16, 1989, which issued as U.S. Pat. No. 4,961,953 on Oct. 9, 1990 which was a continuation of our U.S. patent application Ser. No. 07/127,955, filed Dec. 2, 1987, now abandoned, which, in turn, was a continuation-in-part of our U.S. patent application Ser. No. 06/606,959 filed May 4, 1984, which issued as U.S. Pat. No. 4,734,287 on Mar. 29, 1988.

BACKGROUND

The present invention relates to reduced fat yogurt compositions which include a microparticulated protein product as described in our allowed U.S. Pat. No. 9,961,953 the entire disclosure of which is incorporated by reference herein.

SUMMARY OF THE INVENTION

The present invention is a reduced fat yogurt having all or part of the fat and/or oil content normally found in yogurt replaced with a proteinaceous, water-dispersible, macrocolloid comprising substantially non-aggregated particles of denatured protein having in a dry state a mean diameter particle size distribution ranging from about 0.1 to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

DETAILED DESCRIPTION OF THE INVENTION

Figure 1:
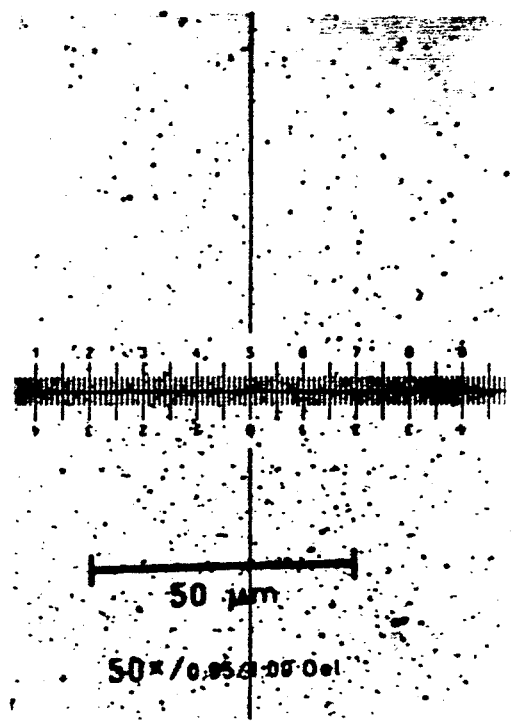
FIG. 1 illustrates a photomicrographic view at 1000× magnification of microparticulated whey protein of the present invention.

The following examples relate to preferred methods and procedures for practicing the present invention. Example 1 relates to a preferred method for the production of microparticulated protein from the proteinaceous material present in acidified whey. Example 2 relates to a preferred method for the production of microparticulated protein from casein micelles and the proteinaceous material present in egg white. Example 3 relates to the production of microparticulated protein from the proteinaceous material in whey. Example 4 relates to the preparation of a sundae style reduced fat yogurt. Example 5 relates to the preparation of a swiss style reduced fat yogurt.

EXAMPLE 1

Microparticulated Protein Produced From Acidified Whey

Microbiologically, aromatically and particulately clean water produced by a reverse osmosis process is added to a sanitary tank.

Commercially available liquid whey protein concentrate is treated by ultrafiltration and evaporation until the concentration of protein is about 50-55% by weight, on a dry basis. The whey protein concentrate is added to the water in the sanitary tank with agitation avoiding aeration through the suction side of a positive displacement pump to achieve a solids concentration of about 37% solids for the mixture.

As this mixture is recirculated back to the sanitary tank, a dilute solution of food acid (acetic, lactic, citric or hydrochloric; alone or in combination) is added through an in-line mixer to lower the pH from about 6.8 to about 4.4±0.05.

The pH adjusted mixture is then rigorously deaerated in a Versator deaerator/homogenizer and bottom fed into a holding tank which is equipped for non-aerating agitation.

The deaerated mix is then pumped (300 lbs/hr) from the holding tank, by a positive displacement pump through an in-line strainer (300 μm cheesecloth) and a mass flow meter, into a plate heat exchanger which heats the mixture to about 165°-180° F., a temperature lower than the target peak temperature which is achieved within a heat and shear generating apparatus ("microcooker"). Flow is manually-controlled based on readings from the in-line flow-meter.

The heated mixture is pumped directly from the plate heat exchanger into the microcooker apparatus as described in U.S. Pat. No. 4,823,396 with the exception that the inlet and outlet ports have been interchanged or exchanged, i.e., the inlet port is disposed where the outlet port is shown in the patent drawing and the outlet port is located at the bottom of the bowl shaped vessel and the temperature of the mixture is raised to about 200° F. within less than 10 seconds under high shear conditions. Rigorous temperature control of the mixture is maintained at 200° F. by means of a cascade control loop. The control loop senses the temperature of the product exiting the microcooker and maintains it at 200° F. by adjusting the temperature of the mixture leaving the plate heat exchanger.

The speed of the rotor in the microcooker is held constant, for example, at about 3715 rpm. At this rpm, the shear rate is about 27,000 reciprocal seconds at the tips of the rotor which has a diameter of approximately 7 inches.

After exiting the microcooker apparatus, the product flows directly into an eccentric scraped surface heat exchange and is cooled with vigorous agitation to less than 130° F. The cooled product then flows through additional heat exchangers (scraped surface of plate type) to reduce its temperature to less than 55° F.

EXAMPLE 2

Microparticulated Protein Produced from Casein Micelles and Egg White

Microbiologically, aromatically and particulately clean water (16.83 wt. %) produced by a reverse osmosis process is heated in a sanitary tank to about 120° F.

Commercially available apple pectin (0.35 wt. %) dry-blended with sugar (5.0 wt. %) to assure its complete dispersion and is then added to the water in the sanitary tank by means of a high shear solid/liquid Tri-blender mixer. This mixture is held at about 120°-140° F. with agitation for about 5 minutes to assure hydration and dissolution of the pectin. The mixture is then cooled to less than about 100° F.

Liquid egg white is ultrafiltered using membrane filters having a molecular weight cut-off of about 10,000. The ultrafiltration reduces the total volume of the liquid egg white by about 50% and effectively doubles the protein content and halves the sodium content of the egg white. The treated egg white (55 wt. %) is added to the pectin solution through the suction side of a positive displacement pump with controlled agitation to avoid aeration.

Condensed skim milk (22.65 wt. %) is then added to the mixture through the suction side of a positive displacement pump.

As this mixture is recirculated back to the sanitary tank, a dilute solution of food acid (0.17 wt. %) (acetic, citric, lactic or hydrochloric; alone or in combination) is added through an in-line mixer to lower the pH from about 7 to about 6.20±0.05.

The pH adjusted mix is then rigorously deaerated in a Versator deaerator and bottom-fed into a holding tank which is equipped for non-aerating agitation.

The deaerated mixture is then pumped (600 lb/hr) from the holding tank, by a positive displacement pump through an in-line strainer (300 μm cheesecloth) and a mass flow meter into a plate heat exchanger which heats the mixture to about 165° F., a temperature lower than the target peak temperature which is achieved within the microcooker apparatus described in Example 1. At this lower temperature no coagulate will have developed. Flow is manually-controlled based upon readings from the in-line flow-meter.

The heated mixture is pumped directly from the plate heat exchanger into the microcooker apparatus and the temperature of the mixture is raised to about 185° F. within less than about 10 seconds under high sheer conditions. Rigorous temperature control is maintained over the temperature of the mixture in the microcooker apparatus by a cascade control loop. The control loop senses the temperature of a product exiting the microcooker and holds the temperature constant by regulating the temperature of the mixture leaving the plate heat exchanger.

The speed of the rotor in the microcooker is held constant at about 5400 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through additional heat exchangers (scraped surface or plate type) to reduce its temperature to less than 55° F.

EXAMPLE 3

Microparticulated Protein Produced From Whey

Commercially available liquid whey is treated by ultrafiltration and evaporation to give a mixture having about 42% by weight solids and about 50%–55% by weight protein, on a dry basis. The resulting whey protein concentrate is deaerated in a Versator deaerator and bottom fed into a sanitary tank equipped for a non-aerating agitation.

The deaerated mixture is then pumped (600 lbs/hr), by a positive displacement pump through an in-line strainer (300 μm cheesecloth), a mass flow meter and plate heat exchanger which raises the temperature of the mixture to about 170° F., into a heated holding device.

The heated holding device includes two concentric scraped surface heat exchangers connected in series. Each heat exchanger provides a hold time of about 3.6 minutes at a flow rate of about 300 lbs/hr. Both of these heat exchangers are heated to maintain the hold temperature set by the plate heat exchanger.

The mixture is then pumped from the holding device to an eccentric scraped surface heat exchanger. This scraped surface heat exchanger cools the mixture to a temperature of about 165° F., a temperature lower than the target peak temperature inside a heat and high shear generating apparatus (microcooker). The mixture then flows directly into the microcooker apparatus as described in Example 1 and the temperature of the mixture is raised to 200° F. within 10 seconds under high shear conditions. Rigorous temperature control at 200° F. is maintained in the microcooker by a cascade control loop. The control loop senses the temperature of a product exiting the microcooker and holds the temperature constant by regulating the temperature of the mixture leaving the eccentric scraped surface heat exchanger.

The speed of the rotor in the microcooker is held constant at about 5200 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through an additional heat exchanger (scraped surface or plate type) to reduce its temperature to less than 55° F.

EXAMPLE 4

Preparation of a Sundae Style Reduced Fat Yogurt

A sundae style reduced fat yogurt was prepared from the ingredients shown in Table 1.

TABLE 1

| Sundae Style Reduced Fat Yogurt | |
|---|---|
| Ingredients | Wt. % of Composition |
| Skim Milk | 91.57 |
| Nonfat Dry Milk | 3.53 |
| Microparticulated Protein (Example 3) | 2.94 |
| Starter Culture System (Chris Hansen CH₃ inoculum) | 1.96 |

The skim milk was heated to about 100°–120° F. in a steam jacketed kettle. Nonfat dry milk and the microparticulated protein prepared as described in Example 3 were added to the heated skim milk and the temperature was increased to about 160° F. The heated mixture was then homogenized at 2500 psi in a first stage and then at 500 psi in a second stage. The homogenized mixture was then pasteurized at 195° F. for 5 minutes, at 185° F. for 30 minutes or, at 203° F. for 6 minutes. The mixture was cooled to about 108°–115° F., the inoculum was added, the inoculated mixture was filled into individual cups and then incubated for about 3.5 hours until the pH reached a value of 4.6. After incubation, the cups were cooled to about 38°–45° F.

EXAMPLE 5

Preparation of a Swiss Style Reduced Fat Yogurt

A swiss style reduced fat yogurt was prepared from the ingredients listed in Table 2 and following the procedures set forth in Example 4 provided that before the inoculated mixture was added to individual cups the inoculated mixture was incubated for 3.5 hours until the pH reached a value of 4.6, and the cultured mixture was then stirred to break the coagulum. The broken coagulum was pumped through a sour cream value into individual cups containing the fruit preparation and the undisturbed cups were cooled to about 40° F.

TABLE 2

| Swiss Style Reduced Fat Yogurt | |
|---|---|
| Ingredient | Wt. % of Composition |
| Cultured Skim Milk with starter culture system | 76.40 |
| Nonfat Dry Milk | 1.63 |
| Fruit Preparation | 15.00 |
| Microparticulated Protein (Example 3) | 4.25 |
| Sugar | 1.7 |
| Modified Food Starch | 0.85 |
| Gelatin | 0.17 |

Numerous modifications and variations in practice of the invention are expected to occur to those skilled in the art upon consideration of the foregoing descriptions of preferred embodiments thereof. Consequently, only such limitations should be placed upon the scope of the invention as appear in the appended claims.

What is claimed is:

1. A reduced fat yogurt, wherein the improvement comprises replacing all or part of the normal fat and/or oil content of the yogurt with a proteinaceous, water-dispersible, macrocolloid comprising substantially non-aggregated particles of denatured protein having in a dry state a mean diameter particle size distribution ranging from about 0.1 microns to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

* * * * *